(12) United States Patent
Sheth et al.

(10) Patent No.: US 12,385,770 B2
(45) Date of Patent: Aug. 12, 2025

(54) SYSTEM AND METHOD OF DETERMINING RESERVOIR FLUID FLOW CONDITION AND COMPOSITION DOWNHOLE

(71) Applicant: Halliburton Energy Services, Inc., Houston, TX (US)

(72) Inventors: Ketankumar Kantilal Sheth, Tulsa, OK (US); Donn J. Brown, Tulsa, OK (US); Robert Charles De Long, Tulsa, OK (US); Christopher Michael Jones, Houston, TX (US); Etienne Samson, Carrollton, TX (US); Bin Dai, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 357 days.

(21) Appl. No.: 18/080,502

(22) Filed: Dec. 13, 2022

(65) Prior Publication Data

US 2024/0192037 A1 Jun. 13, 2024

(51) Int. Cl.
*G01F 1/684* (2006.01)
*E21B 21/08* (2006.01)
(Continued)

(52) U.S. Cl.
CPC .............. *G01F 1/684* (2013.01); *E21B 21/08* (2013.01); *E21B 43/38* (2013.01); *F04D 1/00* (2013.01); *F04D 13/10* (2013.01); *G01F 1/6965* (2013.01)

(58) Field of Classification Search
CPC ........ G01F 1/684; G01F 1/6965; E21B 21/08; E21B 43/38; F04D 1/00; F04D 13/10
See application file for complete search history.

(56) References Cited

U.S. PATENT DOCUMENTS

| 4,693,116 A | * | 9/1987 | Miura | G01F 1/698 |
| | | | | 73/204.16 |
| 5,226,333 A | * | 7/1993 | Hess | G01P 13/04 |
| | | | | 166/241.5 |

(Continued)

FOREIGN PATENT DOCUMENTS

WO  WO-2013026467 A1 *  2/2013 ........... G01F 1/6847

OTHER PUBLICATIONS

WO-2013026467-A1, English Translation (Year: 2013).*

*Primary Examiner* — Ryan D Walsh
(74) *Attorney, Agent, or Firm* — Conley Rose, P.C.; Rodney B. Carroll

(57) ABSTRACT

A fluid flow rate sensor. The fluid flow rate sensor comprises an elongated structure; a heating element installed into a first end of the elongated structure; a first temperature transducer coupled to an outside of the elongated structure at a first predefined location; a second temperature transducer coupled to the outside of the elongated structure at a second predefined location; and a control unit that is configured to turn the heating element on and off, to analyze a first temperature indication received from the first temperature transducer, to analyze a second temperature indication received from the second temperature transducer, to determine a flow rate of a fluid that is in intimate contact with the outside of the elongated structure based on analyzing the first temperature indication and the second temperature indication, and to output the flow rate via a communication line.

21 Claims, 5 Drawing Sheets

(51) Int. Cl.
*E21B 43/38* (2006.01)
*F04D 1/00* (2006.01)
*F04D 13/10* (2006.01)
*G01F 1/696* (2006.01)

(56) References Cited

U.S. PATENT DOCUMENTS

| | | |
|---|---|---|
| 8,731,848 B2 | 5/2014 | Jones et al. |
| 10,132,159 B2 * | 11/2018 | Burgos .................... E21B 47/06 |
| 11,066,921 B1 | 7/2021 | Brown et al. |
| 11,220,904 B2 | 1/2022 | Brown et al. |
| 11,976,550 B1 * | 5/2024 | Chang ..................... E21B 33/12 |
| 2003/0066359 A1 | 4/2003 | Gysling et al. |
| 2007/0125163 A1 * | 6/2007 | Dria .......................... G01F 1/74 |
| | | 166/250.11 |
| 2013/0020097 A1 * | 1/2013 | Veneruso ................ E21B 34/10 |
| | | 166/386 |
| 2014/0157884 A1 * | 6/2014 | Adil ........................ E21B 47/07 |
| | | 73/152.33 |
| 2015/0354351 A1 * | 12/2015 | Morrow .................. E21B 47/10 |
| | | 367/82 |
| 2017/0306751 A1 | 10/2017 | Harrison et al. |
| 2021/0310840 A1 * | 10/2021 | Feagler ............. A61M 5/16886 |

* cited by examiner

SYSTEM AND METHOD OF DETERMINING RESERVOIR FLUID FLOW CONDITION AND COMPOSITION DOWNHOLE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons such as crude oil and gas may be produced from subterranean formations, brought to the surface, and produced to end uses through various surface and subsurface devices such as pumps and compressors. Salt water may be produced from subterranean formations, brought to the surface, flowed to a disposal well, and injected into a disposal well subterranean formation. Hot water may be produced from subterranean formations, brought to the surface, and produced to end uses related to geothermal power applications. In all of these cases flow rates of fluids—liquid phase fluid and/or gas phase fluid—may desirably be determined using fluid flow rate sensors. These can be harsh environments that physically stress conventional fluid flow rate sensors and may make them unreliable and/or curtail their service lives.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid. As used herein, the term "about" when referring to a measured value or fraction means a range of values +/−5% of the nominal value stated. Thus, "about 1 inch," in this sense of "about," means the range 0.95 inches to 1.05 inches, and "about 5000 PSI," in this sense of "about," means the range 4750 PSI to 5250 PSI. Thus, the fraction "about $8/10$s" means the range $76/100$s to $84/100$s.

The present disclosure teaches a novel fluid flow rate sensor and applications for using the novel sensor. The sensor comprises an elongated structure such as a bar, a rod, a cylinder, or other elongated structure. The elongated structure may be a metal, a mixture of metal with a non-metal material, or a non-metal material that has a thermal conductivity similar to that of a metal. A heater element is attached at one end of the elongated structure, and a control unit provides power to the heater element and then removes power from the heater element. The sensor further comprises one or more temperature transducers affixed to an outside of the elongated structure or inserted into a cavity in the elongated structure that provides an indication or indications of temperature at a point of the structure located a distance away from the heater element. The control unit receives temperature indication(s) from the temperature transducer(s) and infers a rate of fluid flow in intimate contact with the outside of the elongated structure based on known thermal properties of the elongated structure, based on presumed values of thermal properties of the fluid, and based on the temperature time transients. This novel fluid flow rate sensor is robust and can provide a long service life in hostile downhole environments and in surface pipe environments.

Figure 1:
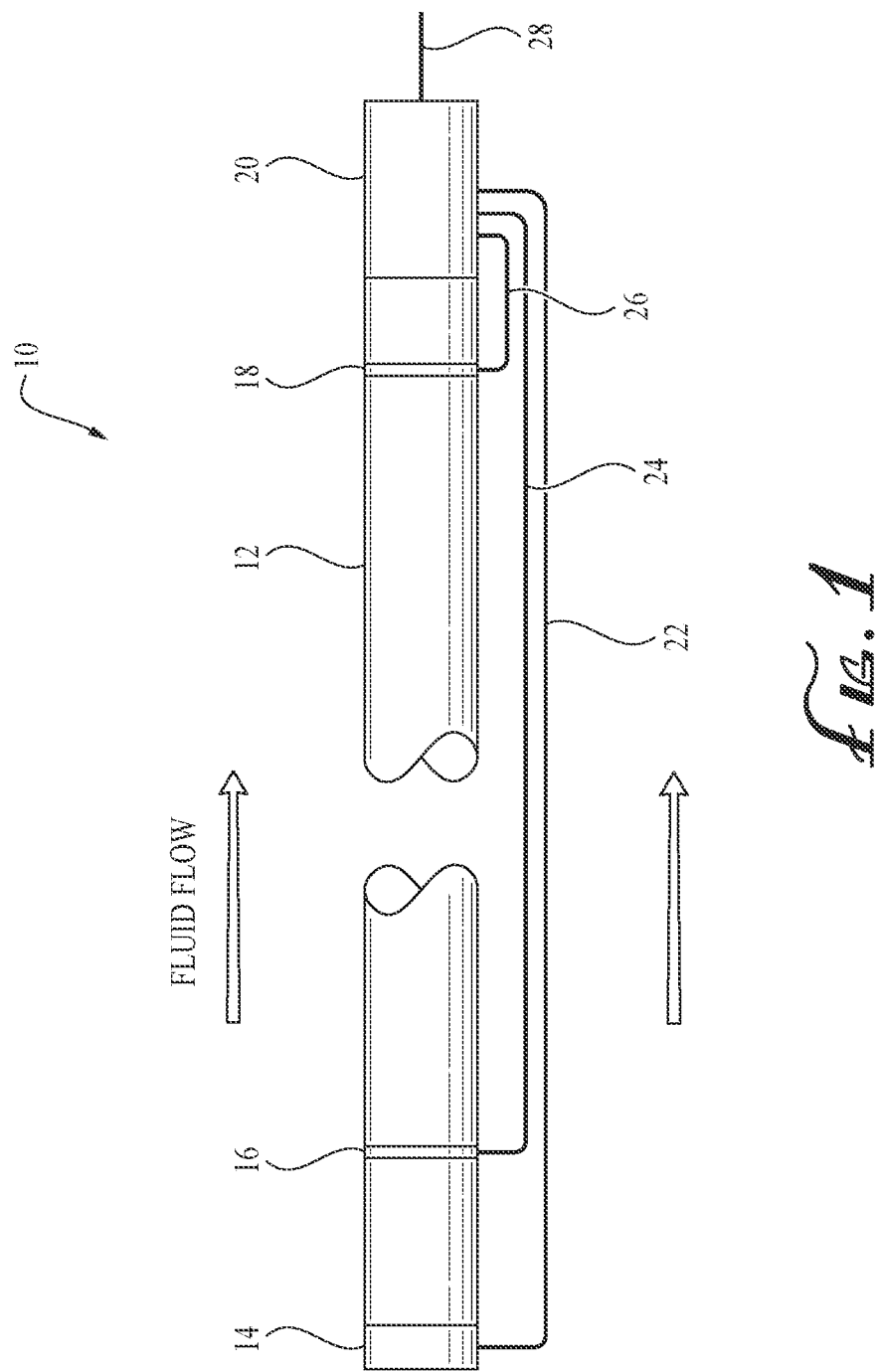
FIG. 1 is a block diagram of a fluid flow rate sensor according to an embodiment of the disclosure.

Turning now to FIG. 1, a fluid flow rate sensor 10 is described. In an embodiment, the fluid flow rate sensor 10 comprises an elongated structure 12, a heater element 14 disposed at a left end of the elongated structure 12, a first temperature transducer 16 disposed over an outside of the elongated structure 12, a second temperature transducer 18 disposed over an outside of the elongated structure 12, and a control unit 20. In some contexts, the control unit 20 may be referred to as a sensor controller. The heater element 14 is connected via a first electrical line 22 to the control unit 20. The first temperature transducer 16 is connected via a second electrical line 24 to the control unit 20. The second temperature transducer 18 is connected via a third electrical line 26 to the control unit 20. It is understood that any or all of the electrical lines 22, 24, 26 may comprise a single wire, two wires, or more than two wires. In an embodiment, a ground or return electrical line from the heater element 14, from the first temperature transducer 16, and from the second temperature transducer 18 to the control unit 20 is provided by the elongated structure 12. In an embodiment, a communication line 28 links the control unit 20 to other equipment not shown in FIG. 1, for example to a control system located at a surface proximate to a well head, for example to a radio transceiver coupled to an outside of an outlet pipe of a horizontal pump system (HPS).

The elongated structure 12 may be formed of copper, of aluminum, of stainless steel, of gold, of platinum, of a noble metal, or of some other metal. In an embodiment, the elongated structure 12 may be a metal alloy that combines a plurality of different metals. In an embodiment, the elongated structure 12 may be a mix of metal and non-metal material. In an embodiment, the elongated structure 12 may be a non-metal material that has thermal conductivity similar to a metal. In an embodiment, the elongated structure 12 is at least 5 times as long as it is thick and less than 10,000 times as long as it is thick. In an embodiment, the elongated structure 12 is at least 10 times as long as it is thick and less than 10,000 times as long as it is thick. The cross-sectional geometry of the elongated structure 12 may be triangular, square, rectangular, quadrilateral, circular, elliptical, pentagonal, hexagonal, or some other geometry. The thermal properties of the elongated structure 12, such as the thermal conductivity and the heat capacity, are known. The geometry and mass of the elongated structure 12 are known.

The heater element 14 may comprise a resistive wire or suitable material that heats up when a current is passed through it. The heater element 14 may be encapsulated within an insulative jacket to assure that the heat generated in the heater element 14 is transferred to the proximate end of the elongated structure 12. While illustrated as disposed at an upstream end of the elongated structure 12, in another embodiment, the heater element 14 may be disposed at a downstream end of the elongated structure 12.

The first temperature transducer 16 may be a thermocouple, a resistance temperature detector (RTD), a fiber optic device, or another type of temperature transducer. The second temperature transducer 18 may be a thermocouple, an RTD, a fiber optic device, or another type of temperature transducer. The temperature transducers 16, 18 may be attached to an outside of the elongated structure 12. The temperature transducers 16, 18 may be inserted into a cavity formed in the surface of the elongated structure 12 to provide temperature sensing access to an interior of the elongated structure 12. While two temperature transducers 16, 18 are illustrated in FIG. 1, in other embodiments, the sensor 10 may have only one temperature transducer, three temperature transducers, four temperature transducers, five temperature transducers, six temperature transducers, or some other number of temperature transducers less than twenty temperature transducers. The temperature transducers 16, 18 are each located at a known distance away from the heater element 14. The first temperature transducer 16 is located at a different distance away from the heater element 14 than the distance the second temperature transducer 18 is located away from the heater element 14.

The control unit 20 comprises circuitry to turn the heater element 14 on and off at timed intervals as well as electric power to provide energy to the heater element 14. In an embodiment, the control unit 20 comprises an electric battery. In an embodiment, the control unit 20 receives electric power via the communication line 28. The heater control circuitry may comprise an electro-mechanical article such as a relay. The heater control circuitry may comprise simple semi-conductor logic implemented by a microcontroller chip, a programmable logic device (PLD), a field programmable gate array (FPGA), an application specific integrated circuit (ASIC), or other.

The control unit 20 can receive indications of temperature from the first temperature transducer 16 and from the second temperature transducer 18. The control unit 20 can estimate a fluid flow rate in intimate contact with the outside of the elongated structure 12 based on the known thermal properties (e.g., heat capacity and thermal conductivity) of the elongated structure 12, based on the indications of temperature provided by the first temperature transducer 16 and the second temperature transducer 18, based on when it turned on and when it turned off the heater element 14, based on how much energy it provided to the heater element 14, and based on presumed values of the thermal properties of the fluid itself (e.g., the heat capacity and the thermal conductivity of the fluid). The control unit 20 can output the estimated fluid flow rate via the communication line 28. In an embodiment, the control unit 20 may modulate the value of the estimated fluid flow rate onto a carrier signal and output the modulated carrier signal via the communication line 28.

The presumed values of the thermal properties of the fluid may be established in a variety of different ways. The presumed values may be configured into the control unit 20 as a default value. The default values of thermal properties may be configured into the control unit 20 based on samples of production fluid taken in the given location, either taken uphole or taken downhole. For example, the control unit 20 may be configured with a first set of presumed values of thermal properties of a hydrocarbon liquid, a second set of presumed values of thermal properties of a salt water liquid, and a third set of presumed values of thermal properties of gas. In an embodiment, if the samples contain miscible fluids from more than one source, the fluid properties may be deconvoluted based on chemical composition or physical properties according to the principles of equations of state. The deconvolution may include more than one sample if multiple mixtures of different contents are taken. Heat capacity and thermal conductivity of the fluids may be measured directly and then partitioned to individual constituents or may be calculated from associated properties such as but not limited to composition and or viscosity and or density.

When the control unit 20 is operating, it may autonomously determine which of the three sets of presumed thermal properties to use—the first set, the second set, or the third set—based on a range of expected rate of fluid flow. For example, if the fluid flow rate determined by using the first set of presumed values of thermal properties in calculations maps to a flow rate of 1,000,000 barrels per day, the control unit 20 may rule out the first set of presumed values. If the fluid flow rate determined by using the third set of presumed values of thermal properties in calculations maps to a flow rate of 0.1 barrel per day, again, the control unit 20 may rule out the third set of presumed values. If the fluid flow rate determined by using the second set of presumed values of thermal properties in calculations maps to a flow rate in the range of 400 barrels per day to 15,000 barrels per day, the second set of presumed values may be deemed suitable.

In the case that the control unit 20 chooses one of a plurality of presumed thermal properties of the fluid based on a reasonable estimated fluid flow rate value, the control unit 20 may output the values of the selected thermal properties of the fluid via the communication line 28. In an embodiment, the control unit 20 may modulate the values of the selected thermal properties of the fluid onto a carrier signal and transmit the modulated carrier signal via the communication line. In an embodiment, the control unit 20 may modulate both the value of the estimated fluid flow rate and the values of the thermal properties of the fluid onto the same carrier signal and output the modulated carrier signal on the communication line 28.

In an embodiment, bottom hole samples may be taken as reference (e.g., to determine or estimate thermal properties of the fluid) at any time and predicted to a future point through a compositional trajectory calculation based on production rates and equation of state with state variables. Such trajectory calculations may be constrained by surface sample measurements at any given time. A trajectory calculation predicts fluid property changes as a function of production and production conditions. Fluid properties may be physical properties including but not limited to density, viscosity, gas to oil ratio, gas to liquid ratio, formation volume factor, compressibility or chemical properties including but not limited to the fluid composition such as hydrocarbon distribution or ionic content.

In an embodiment, the control unit 20 may be commanded via the communication line 28 to use the default presumed values of thermal properties of liquid phase fluid of salt water or of gas phase fluid, for example from a control station located proximate a wellhead at the surface. In an embodiment, production fluid may be measured at the surface or at a pipeline location to determine its thermal properties, and these measured values of thermal properties may be configured into the control unit 20, for example via the communication line 28.

The control unit 20 may periodically turn the heater element 14 on and off. In an embodiment, the on cycle may be longer than the off cycle. In another embodiment, the off cycle may be longer than the on cycle. In an embodiment, the control unit 20 uses only the temperature indications produced by the temperature transducers 16, 18 while the heater element 14 is turned on to determine the fluid flow rate. In another embodiment, the control unit 20 uses only the temperature indications produced by the temperature transducers 16, 18 while the heater element 14 is turned off to determine the fluid flow rate. In both these embodiments, the control unit 20 may use the temperature indications—independently of the actual fluid flow rate calculations—to determine when to turn the heater element 14 on and when to turn the heater element 14 off. In an embodiment, the control unit 20 uses the temperature indications produced by the temperature transducers 16, 18 both when the heater element 14 is turned on and when the heater element 14 is turned off to determine the fluid flow rate.

In an embodiment, the pulsing of heat by the heater element 14 into the elongated structure 12 induces a transient time-based temperature flow in the elongated structure 12 from which the flow rate of the fluid in intimate contact with the outside of the elongated structure 12 can be inferred by the control unit 20. In an embodiment, the cycle may repeat about every 10 seconds, about every 15 seconds, about every 20 seconds, about every 25 seconds, about every 30 seconds, about every 35 seconds, about every 40 seconds, about every 45 seconds, about every 50 seconds, about every 55 seconds, about every 60 seconds, about every 75 seconds, about every 90 seconds, about every 120 seconds, or some other time interval. In an embodiment, the cycle may repeat between every 10 seconds and every 120 seconds. In an embodiment, the cycle may repeat between every 15 seconds and every 90 seconds. In an embodiment, the cycle may repeat between every 20 seconds and every 60 seconds. In an embodiment, the cycle may repeat between every 25 seconds and every 50 seconds. In an embodiment, the cycle may repeat between every 30 seconds and every 45 seconds.

The fluid flow rate sensor 10 may be used in a variety of different environments for measuring a flow rate of a fluid. Some of these different use environments are described in detail below, but it will be appreciated that these detailed examples are not meant to limit the practical use of the fluid flow rate sensor 10 to only these two detailed examples. In an embodiment, it is desirable for an axis of the elongated structure 12 to be about parallel with the direction of fluid flow. In another embodiment, however, it may be desirable to orient the axis of the elongated structure 12 diagonally to the direction of fluid flow (for example, between 30 degrees to 60 degrees offset from the direction of fluid flow), whereby to measure different fluid flow rates at different radial displacements from a centerline of a flow passage.

Figure 2:
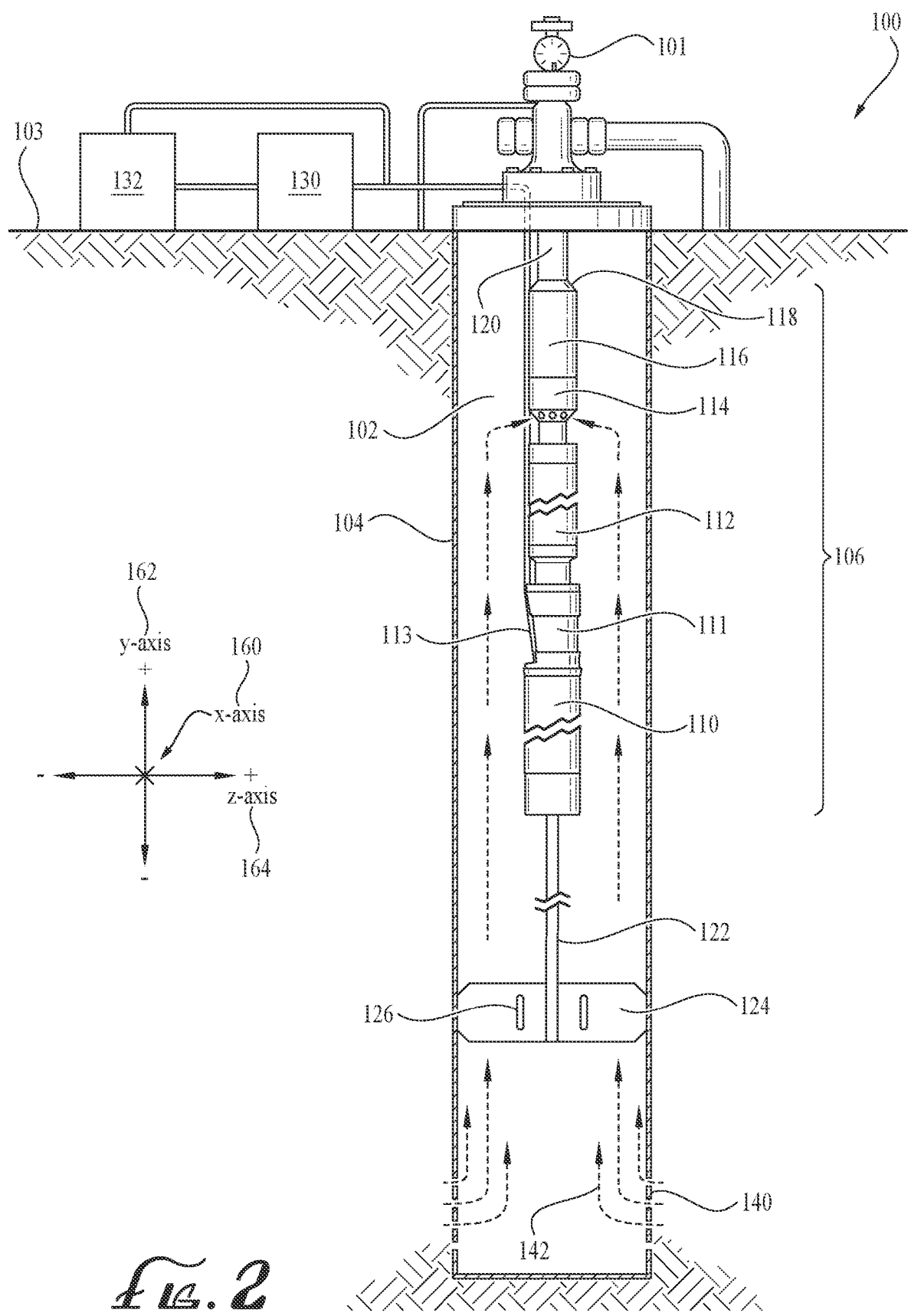
FIG. 2 is an illustration of a completion string according to an embodiment of the disclosure.

Turning now to FIG. 2, a well site environment 100, according to one or more aspects of the disclosure, is described. The well site environment 100 comprises a wellbore 102 that is at least partially cased with casing 104. As depicted in FIG. 1, the wellbore 102 is substantially vertical, but the electric submersible pump (ESP) assembly 106 described herein also may be used in a wellbore 102 that has a deviated or horizontal portion. In an embodiment, rather than an ESP assembly 106 providing fluid lift, a progressive cavity pump, a jet pump, rod lift, or other types of artificial lift may be deployed in the wellbore 102 to lift wellbore fluids to the surface 103. The well site environment 100 may be at an on-shore location or at an off-shore location. The ESP assembly 106 in an embodiment comprises an electric motor 110, a motor head 111 that couples the electric motor 110 to a seal unit 112, a fluid intake 114, and a centrifugal pump assembly 116. In an embodiment, the electric motor 110 may be replaced by a hydraulic turbine, a pneumatic turbine, a hydraulic motor, or an air motor, and in this case the assembly 106 may be referred to as a submersible pump assembly. The centrifugal pump assembly 116 comprises a plurality of pump stages, where each pump stage comprises an impeller coupled to a drive shaft of the centrifugal pump assembly 116 and a diffuser that is retained by a housing of the centrifugal pump assembly 116. In an embodiment, the ESP assembly 106 may further comprise a gas separator assembly (not shown) that may be located between the fluid intake 114 and the centrifugal pump assembly 116. In an embodiment, the fluid intake 114 may be integrated into a downhole end of the optional gas separator. In an embodiment, the fluid intake 114 may be integrated into a downhole end of the centrifugal pump assembly 116.

The centrifugal pump assembly 116 may couple to a production tubing 120 via a connector 118. An electric cable 113 may attach to the electric motor 110 and extend to the surface 103 to connect to an electric power source 130 that is controlled by a controller 132. In an embodiment, where the electric motor 110 is replaced by a hydraulic turbine or a hydraulic motor, the electric cable 113 may be replaced by a hydraulic power supply line. In an embodiment, where the electric motor 110 is replaced by a pneumatic turbine or an air motor, the electric cable 113 may be replaced by a pneumatic power supply line. The casing 104 and/or wellbore 102 may have perforations 140 that allow well fluid 142 to pass from the subterranean formation through the perforations 140 and into the wellbore 102. In some contexts, well fluid 142 may be referred to as reservoir fluid.

In an embodiment, a probe structure 122 is coupled to a downhole end of the electric motor 110 (or to a downhole end of an optional sensor package (not shown)) and a centralizer 124 comprising a plurality of vanes is coupled at the downhole end of the probe structure 122. A plurality of fluid flow rate sensors 126 are retained between the vanes of the centralizer 124. Each of the plurality of fluid flow rate sensors 126 retained between the vanes of the centralizer 124 may be substantially similar to the fluid flow rate sensor 10 described above with reference to FIG. 1. The centralizer 124 can promote ease of stabbing the probe structure 122 downhole into the wellbore 102 while running in. The centralizer 124 can protect the fluid flow rate sensors 126 and locate them in a desired position within the wellbore 102.

A communication line of each of the plurality of fluid flow rate sensors 126 (e.g., the communication line 28 of the fluid flow rate sensor 10 of FIG. 1) may be routed along the probe structure 122 (or within an interior of the probe structure 122) back to the electric cable 113 and may be encapsulated within the protective sheath of the electric cable 113 extending to the surface 103. At the surface, the communication lines of the plurality of fluid flow rate sensors 126 are communicatively coupled to the controller 132. It will be appreciated that the separate communications of each of the plurality of fluid flow rate sensors 126 may be combined and/or multiplexed along a shared communication line (e.g., where the vanes couple to the downhole end of the probe structure 122 and/or where the communication lines connect to the electric cable 113), for example using time division multiplexing, using frequency division multiplexing, or using a different communication technique.

While a single centralizer 124 is illustrated in FIG. 2 coupled to the downhole end of the probe structure 122, in another embodiment there may be two, three, four, five, or more centralizers 124 that retain fluid flow rate sensors 126 between their vanes located at periodic distances along the probe structure 122, for example located every 50 feet along the probe structure 122, every 100 feet along the probe structure, every 150 feet along the probe structure, every 200 feet along the probe structure, or some other interval. The probe structure 122 may be provided as a metal rod or a series of metal rods coupled together, as for example a male threaded end of one metal rod threaded into a female threaded end of the joined metal rod.

The well fluid 142 may flow uphole, past the centralizer 124 and the fluid flow sensors 126, towards the ESP assembly 106 and into the fluid intake 114. The well fluid 142 may comprise a liquid phase fluid. The well fluid 142 may comprise a gas phase fluid mixed with a liquid phase fluid. The well fluid 142 may comprise only a gas phase fluid (e.g., simply gas). Over time, the gas-to-fluid ratio of the well fluid 142 may change dramatically. For example, in the circumstance of a horizontal or deviated wellbore, gas may build up in high points in the roof of the wellbore and after accumulating sufficiently may "burp" out of these high points and flow downstream to the ESP assembly 106 as what is commonly referred to as a gas slug. Thus, immediately before a gas slug arrives at the ESP assembly 106, the gas-to-fluid ratio of the well fluid 142 may be very low (e.g., the well fluid 142 at the ESP assembly 106 is mostly liquid phase fluid); when the gas slug arrives at the ESP assembly 106, the gas-to-fluid ratio is very high (e.g., the well fluid 142 at the ESP assembly 106 is entirely or almost entirely gas phase fluid); and after the gas slug has passed the ESP assembly 106, the gas-to-fluid ratio may again be very low (e.g., the well fluid 142 at the ESP assembly 106 is mostly liquid phase fluid).

Under normal operating conditions (e.g., well fluid 142 is flowing out of the perforations 140, the ESP assembly 106 is energized by electric power, the electric motor 110 is turning, and a gas slug is not present at the ESP assembly 106), the well fluid 142 enters the fluid intake 114, flows into the centrifugal pump assembly 116, and the centrifugal pump assembly 116 flows the fluid through the connector 118 and up the production tubing 120 to a wellhead 101 at the surface 103. The centrifugal pump assembly 116 provides pumping pressure or pump head to lift the well fluid 142 to the surface. The well fluid 142 may comprise hydrocarbons such as crude oil and/or natural gas. The well fluid 142 may comprise water. In a geothermal application, the well fluid 142 may comprise hot water. An orientation of the wellbore 102 and the ESP assembly 106 is illustrated in FIG. 1 by an x-axis 160, a y-axis 162, and a z-axis 164.

The controller 132 may send commands to the plurality of fluid flow rate sensors 126 via a communication line to configure presumed values of thermal properties of the well fluid 142. The presumed values of thermal properties may be input to the controller 132 by a human being using an interface or workstation (not shown) communicatively coupled at least temporarily to the controller 132. In an embodiment, the input to the controller 132 may be provided from a remote location such as a regional technology center via wired or wireless communication link. The controller 132 may receive indications of fluid flow rate from each of the plurality of fluid flow rate sensors 126. The controller 132 may perform signal conditioning on the fluid flow rate indications received from the plurality of fluid flow rate sensors 126 in various ways, for example to filter out noise in the indications, for example by converting differential signal values to normalized signal values, for example by averaging several recently received values of fluid flow rate indications. The averaging may be performed relative to fluid flow rate values received from the same fluid flow rate sensor 126 over time. The averaging may be performed relative to fluid flow rate values received from different fluid flow rate sensors 126 at the same time. The controller 132 may compare different fluid flow rate indications received from the plurality of fluid flow rate sensors 126, for example to determine that a portion of the well fluid 142 proximate a first fluid flow rate sensor 126 is primarily a gas while a portion of the well fluid 142 proximate a second fluid flow rate sensor 126 is primarily a liquid (e.g., when the centralizer 124 is disposed in a horizontal section of the wellbore 102). The controller 132 provides control inputs to the electric power source 130 whereby to maintain the operation of the ESP assembly 106 within desired parameters. In an embodiment, the controller 132 can adapt the control inputs to the electric power source 130 based, at least in part, on its analysis of the indications of fluid flow rate received from the plurality of fluid flow rate sensors 126.

Figure 3:
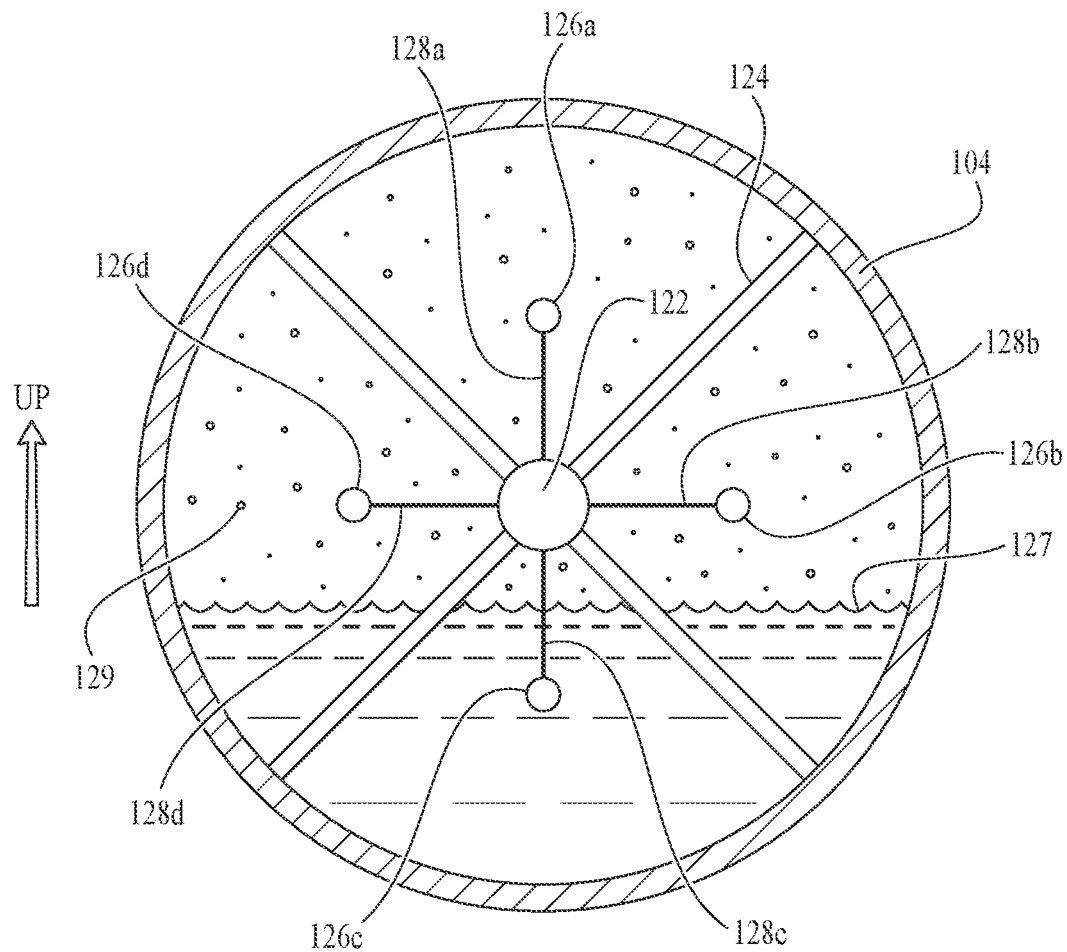
FIG. 3 is an illustration of a disposition of fluid flow rate sensors in a downhole environment according to an embodiment of the disclosure.

Turning now to FIG. 3, a cross-section view of the centralizer 124 and sensors 126 in a horizontal section of a wellbore 102 is described. As illustrated in FIG. 3, the centralizer 124 comprises four vanes, but in other embodiments, the centralizer 124 may comprise three vanes, five vanes, six vanes, seven vanes, eight vanes, nine vanes, ten vanes, or more vanes. As illustrated in FIG. 3, four fluid flow rate sensors 126 are retained between the vanes of the centralizer 124, but in other embodiments, the centralizer 124 may retain three fluid flow rate sensors, five fluid flow rate sensors, six fluid rate flow sensors, seven fluid flow rate sensors, eight fluid flow rate sensors, nine fluid flow rate sensors, ten fluid flow rate sensors, or more fluid flow rate sensors. In an embodiment, there may be two fluid flow rate sensors located between each different pair of two vanes of the centralizer 124, whereby to provide back-up redundancy in case one of the two fluid flow rate sensors fails downhole.

As illustrated in FIG. 3, a first fluid flow rate sensor 126a is coupled to the probe structure 122 by a first bracket 128a, a second fluid flow rate sensor 126b is coupled to the probe structure 122 by a second bracket 128b, a third fluid flow rate sensor 126c is coupled to the probe structure 122 by a third bracket 128c, and a fourth fluid flow rate sensor 126d is coupled to the probe structure 122 by a fourth bracket 128d. While in FIG. 3, a single fluid flow rate sensor 126 is shown associated with a single bracket 128, in an embodiment, a plurality of fluid flow rate sensors 126 may be retained by the same bracket, for example distributed at different radial distances from the probe structure 122, whereby to determine fluid flow rates at different radial distances from the centerline of the wellbore 102.

The casing 104 in FIG. 3 is illustrated as having a pool of liquid 127 in a bottom part of the casing 104 and being filled with gas 129 in an upper part of the casing 104. By comparing the different indications of fluid flow rate received from the different fluid flow rate sensors 128, the controller 132 may be able to make inferences about whether a gas slug is approaching the ESP assembly 106 and may adapt the operation of the ESP assembly 106 accordingly.

Figure 4:
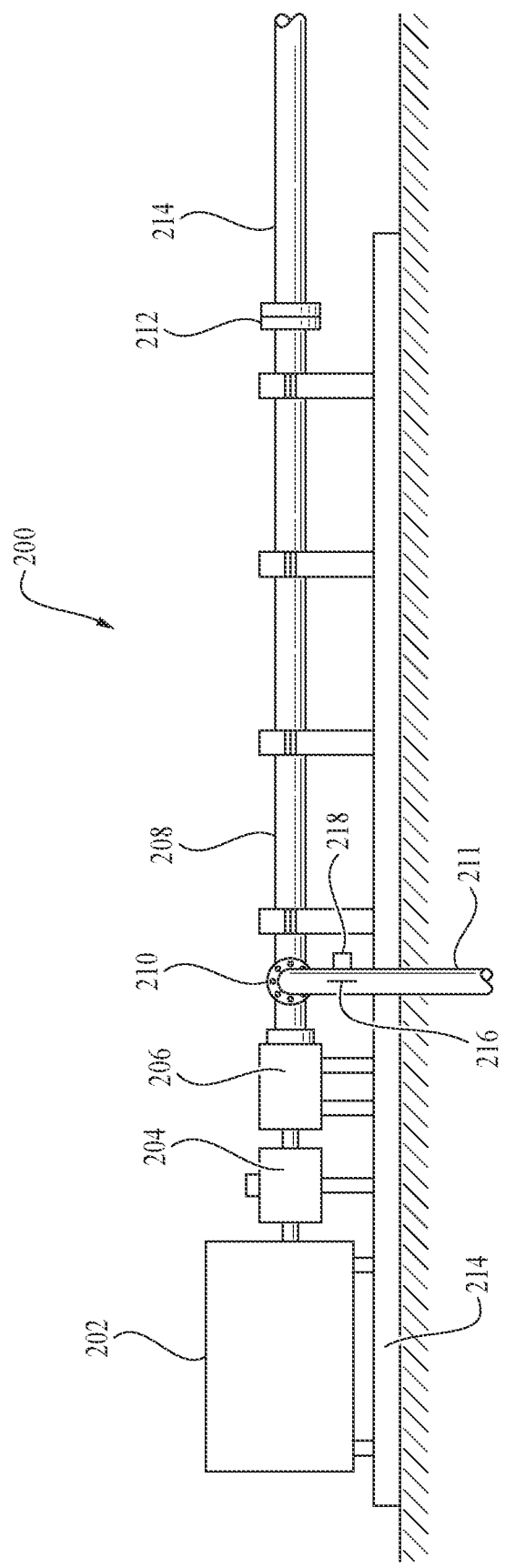
FIG. 4 is an illustration of a horizontal pump system (HPS) and disposition of a fluid flow rate sensor in a pipe according to an embodiment of the disclosure.

Turning now to FIG. 4, horizontal pump system (HPS) 200 at a surface location is described. In an embodiment, the HPS 200 comprises a motor 202, a rotational coupling 204, a mechanical seal 206, and a centrifugal pump assembly 208. As illustrated in FIG. 4, a fluid inlet 210 is integrated into a first end of the centrifugal pump assembly 208 and is coupled to a tubing 211 that extends below the surface into a subterranean formation and a fluid outlet 212 is integrated into a second end of the centrifugal pump assembly 208 and is connected to a pipe 214. The motor 202, the rotational coupling 204, the mechanical seal 206, and the centrifugal pump assembly 208 may be mounted on a skid 214 such that it can be easily transported to a location on a truck and placed on the ground at the location. The centrifugal pump assembly 208 comprises a plurality of pump stages, where each pump stage comprises an impeller coupled to a drive shaft of the centrifugal pump assembly 208 and a diffuser that is retained by a housing of the centrifugal pump assembly 208.

The motor 202 may be an electric motor, a hydraulic turbine, or an air turbine. When the motor 202 turns, the drive shaft of the centrifugal pump assembly 208 turns, turning the impellers of the centrifugal pump assembly 208. The torque provided by the motor 202 is transferred via the rotational coupling 204 to the drive shaft of the centrifugal pump assembly 208.

The HPS 200 may be applied for use in a variety of different surface operations. The HPS 200 can be used as a crude oil pipeline pressure and/or flow booster. The HPS 200 can be used in a mine dewatering operation (e.g., removing water from a mine). The HPS 200 can be used in geothermal energy applications, for example to pump geothermal water from a wellhead through a pipe to an end-use or energy conversion facility. The HPS 200 can be used in carbon sequestration operations. The HPS 200 can be used in salt water disposal operations, for example receiving salt water from a wellbore and pumping the salt water under pressure down into a disposal well. The HPS 200 can be used in desalinization operations.

One or more fluid flow sensors 216 may be disposed within the pipe 211 at the inlet of the HPS 200. Each of the fluid flow sensors 216 are substantially similar to the fluid flow sensor 10 described above with reference to FIG. 1. A communication line of the fluid flow sensor 216 (e.g., the communication line 28 illustrated in FIG. 1) may be communicatively coupled to a communication transceiver 218 disposed on an outside of the pipe 211. The communication transceiver 218 may communicate via a wired or wireless communication link to a monitoring station located proximate to the HPS 200 or located remote from the HPS 200. For example, the communication transceiver 218 may communicate wirelessly to a monitoring station remote from the HPS 200. In an embodiment, the pipe 214 may be a pipeline that extends over hundreds of yards, over a mile, over two miles, over five miles, over ten miles, over fifteen miles, over twenty miles, over twenty-five miles, over forty miles, over fifty miles, or over a greater distance.

In an embodiment, the communication transceiver 218 communicates a fluid flow rate and optionally fluid thermal properties output by the fluid flow sensor 216 to a controller that adjusts the angular speed of the motor 202, whereby to adjust the angular speed of the centrifugal pump assembly 208 to adjust the output fluid flow rate of the centrifugal pump assembly 208. The fluid thermal properties output by the fluid flow sensor 216 can include the phase condition of the fluid, such as water, gas, or oil. The fluid flow sensor 216 can output fluid viscosity, density, and volume fractions of fluid phases.

Figure 5:
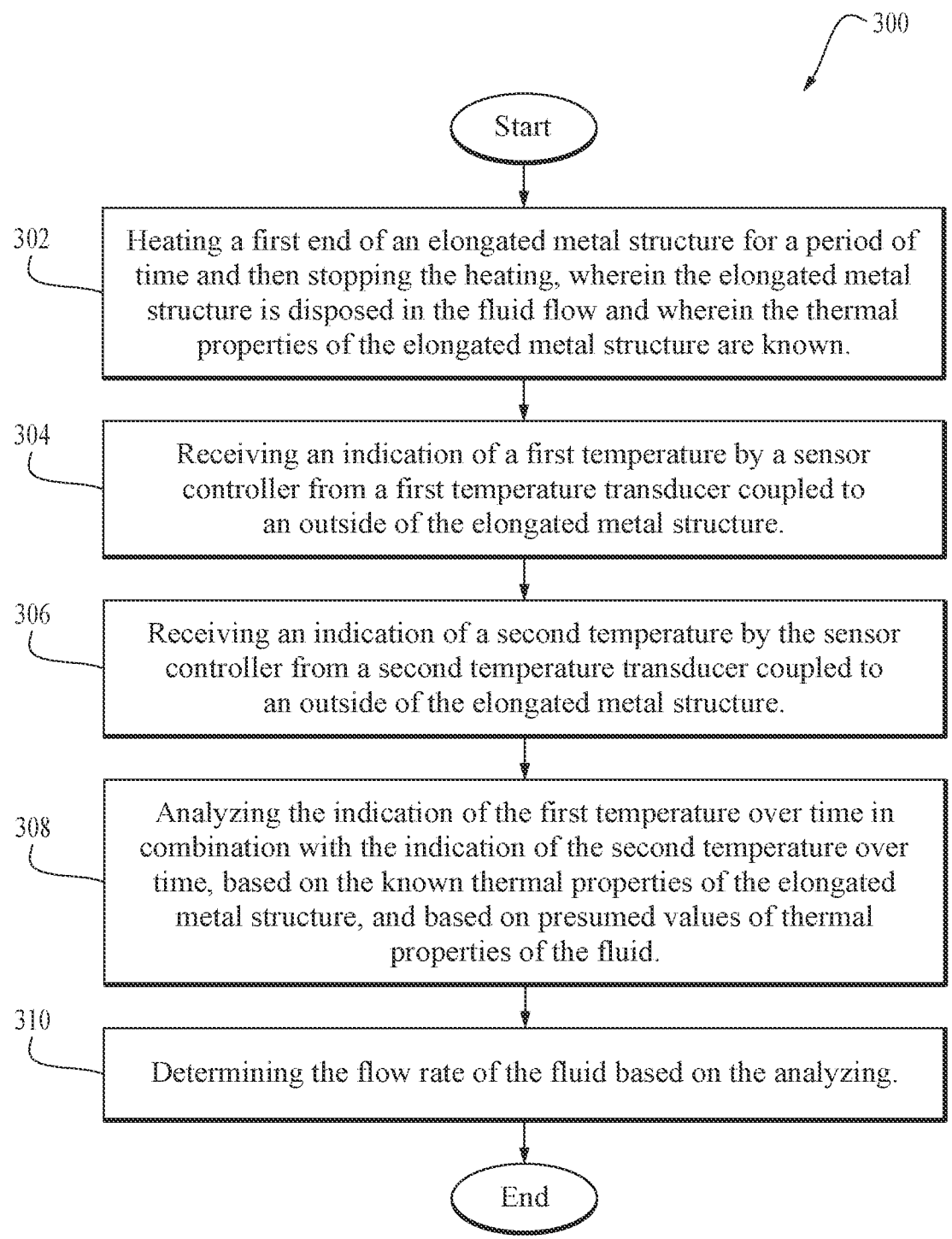
FIG. 5 is a flow chart of a method of determining a fluid flow rate using a fluid flow rate sensor according to an embodiment of the disclosure.

Turning now to FIG. 5, a method 300 is described. In an embodiment, the method 300 is a method of sensing a rate of a fluid flow. At block 302, the method 300 comprises heating a first end of an elongated structure for a period of time and then stopping the heating, wherein the elongated structure is disposed in the fluid flow and wherein the thermal properties of the elongated structure are known. In an embodiment, the sensor controller starts the heating cyclically between about every 10 seconds and about every 120 seconds. In an embodiment, the method 300 is at least partly performed by the fluid flow sensor 10 described above with reference to FIG. 1. In an embodiment, the elongated structure comprises copper, aluminum, stainless steel, gold, or platinum.

At block 304, the method 300 comprises receiving an indication of a first temperature by a sensor controller from a first temperature transducer coupled to an outside of the elongated structure. At block 306, the method 300 comprises receiving an indication of a second temperature by the sensor controller from a second temperature transducer coupled to an outside of the elongated structure.

At block 308, the method 300 comprises analyzing the indication of the first temperature over time in combination with the indication of the second temperature over time, based on the known thermal properties of the elongated structure, and based on presumed values of thermal properties of the fluid. At block 310, the method 300 comprises determining the flow rate of the fluid based on the analyzing.

In an embodiment, the method 300 further comprises transmitting the presumed values of thermal properties of the fluid to the sensor controller. In an embodiment, the method 300 further comprises adjusting a speed of an electric motor that provides torque to a pump that is pumping the fluid based on the determined flow rate of the fluid.

ADDITIONAL EMBODIMENTS

The following are non-limiting, specific embodiments in accordance with the present disclosure:

A first embodiment, which is a fluid flow rate sensor comprising an elongated structure; a heating element installed into a first end of the elongated structure; a first temperature transducer coupled to an outside of the elongated structure at a first predefined location; a second temperature transducer coupled to the outside of the elongated structure at a second predefined location; and a control unit that is configured to turn the heating element on and off, to analyze a first temperature indication received from the first temperature transducer, to analyze a second temperature indication received from the second temperature transducer, to determine a flow rate of a fluid that is in intimate contact with the outside of the elongated structure based on analyzing the first temperature indication and the second temperature indication, and to output the flow rate via a communication line.

A second embodiment, which is the fluid flow rate sensor of the first embodiment, wherein the elongated structure is metal material.

A third embodiment, which is the fluid flow rate sensor of the second embodiment, wherein the elongated structure comprises copper, aluminum, stainless steel, gold, or platinum.

A fourth embodiment, which is the fluid flow rate sensor of the first embodiment, wherein the elongated structure is a mix of metal and non-metal material A fifth embodiment, which is the fluid flow rate sensor of the first embodiment, wherein the elongated structure is a non-metal material that has thermal conductivity similar to the thermal conductivity of metal.

A sixth embodiment, which is the fluid flow rate sensor of any of the first through the fifth embodiment, wherein the first temperature transducer and the second temperature transducer each comprises a thermocouple.

A seventh embodiment, which is the fluid flow rate sensor of any of the first through the sixth embodiment, wherein the first temperature transducer and the second temperature transducer each comprises a resistance temperature detector (RTD).

An eighth embodiment, which is the fluid flow rate sensor of any of the first through the seventh embodiment, wherein the control unit is configured to receive and store presumed values of thermal properties of the fluid that is in intimate contact with the outside of the elongated structure and wherein the control unit determines the flow rate of the fluid that is in intimate contact with the outside of the elongated structure based in part on the stored presumed values of thermal properties of the fluid that is in intimate contact with the outside of the elongated structure.

A ninth embodiment, which is the fluid flow rate sensor of the eighth embodiment, wherein the control unit is configured to store a plurality of sets of thermal properties of the fluid that is in intimate contact with the outside of the elongated structure, wherein the control unit is configured to select which of the sets of thermal properties of the fluid that is in intimate contact with the outside of the elongated structure to use to determine the flow rate of the fluid that is in intimate contact with the outside of the elongated structure, and wherein the control unit is configured to output the values of the selected set of thermal properties of the fluid that is in intimate contact with the outside of the elongated structure via the communication line.

A tenth embodiment, which is the fluid flow rate sensor of any of the first through the ninth embodiment, wherein the control unit is configured with known values of thermal properties of the elongated structure and wherein the control unit determines the flow rate of the fluid that is in intimate contact with the outside of the elongated structure based in part on the configured known values of thermal properties of the elongated structure.

An eleventh embodiment, which is a system comprising a fluid conduit; an at least one fluid flow rate sensor according to any of the first through the tenth embodiment installed in an interior of the fluid conduit; a fluid flow rate transmitter operable to transmit the flow rate sensed by the at least one fluid flow rate sensor and to transmit an identity of the at least one fluid flow rate sensor; and a receiver operable to receive the transmission of the flow rate of the at least one fluid flow sensor.

A twelfth embodiment, which is a system comprising a fluid conduit; an at least one fluid flow rate sensor installed in an interior of the fluid conduit, wherein each fluid flow rate sensor comprises an elongated structure, a heating element installed into a first end of the elongated structure, a first temperature transducer coupled to an outside of the elongated structure at a first location, a second temperature transducer coupled to the outside of the elongated structure at a second location, and a control unit that is configured to turn the heating element on and off, to analyze a first temperature indication received from the first temperature transducer, to analyze a second temperature indication received from the second temperature transducer, and to determine a flow rate of a fluid flowing in the fluid conduit based on analyzing the first temperature indication and the second temperature indication; a fluid flow rate transmitter operable to transmit the flow rate sensed by the at least one fluid flow rate sensor and to transmit an identity of the at least one fluid flow rate sensor; and a receiver operable to receive the transmission of the flow rate of the at least one fluid flow rate sensor.

A thirteenth embodiment, which is the system of the twelfth embodiment, wherein the fluid conduit is a production tubing in a wellbore.

A fourteenth embodiment, which is the system of the twelfth embodiment, wherein the fluid conduit is a casing in a wellbore, wherein the system further comprises a production tubing disposed in the casing; an electric submersible pump assembly disposed in the casing and comprising an electric motor, a seal section coupled to an uphole end of the electric motor, and a centrifugal pump coupled directly or indirectly to the seal section and having an outlet fluidically coupled to the production tubing; a probe structure coupled to a downhole end of the electric motor, a centralizer comprising a plurality of vanes coupled to the probe structure, wherein the at least one fluid flow rate sensor is retained by at least one bracket that is coupled to the centralizer.

A fifteenth embodiment, which is the system of the twelfth embodiment, wherein the system comprises a horizontal pump system (HPS) comprising a motor comprising a first drive shaft and a centrifugal pump assembly comprising a second drive shaft that is coupled directly or indirectly to the first drive shaft of the motor and a plurality of pump stages, wherein each pump stage comprises an impeller coupled to the second drive shaft and a diffuser retained by a housing of the centrifugal pump assembly and wherein the fluid conduit is fluidically coupled to an inlet of the centrifugal pump assembly or to an outlet of the centrifugal pump assembly.

A sixteenth embodiment, which is a method of sensing a rate of a fluid flow, comprising heating a first end of an elongated structure for a period of time and then stopping the heating, wherein the elongated structure is disposed in the fluid flow and wherein the thermal properties of the elongated structure are known; receiving an indication of a first temperature by a sensor controller from a first temperature transducer coupled to an outside of the elongated structure; receiving an indication of a second temperature by the sensor controller from a second temperature transducer coupled to an outside of the elongated structure; analyzing the indication of the first temperature over time in combination with the indication of the second temperature over time, based on the known thermal properties of the elongated structure, and based on presumed values of thermal properties of the fluid; and determining the flow rate of the fluid based on the analyzing.

A seventeenth embodiment, which is the method of the sixteenth embodiment, further comprising transmitting the presumed values of thermal properties of the fluid to the sensor controller.

An eighteenth embodiment, which is the method of the sixteenth embodiment, or the seventeenth embodiment, wherein the sensor controller starts the heating cyclically between about every 10 seconds and about every 120 seconds.

A nineteenth embodiment, which is the method of any of the sixteenth through the eighteenth embodiment, wherein the method further comprises adjusting a speed of an electric motor that provides torque to a pump that is pumping the fluid based on the determined flow rate of the fluid.

A twentieth embodiment, which is the method of any of the sixteenth through the nineteenth embodiment, wherein the elongated structure comprises copper, aluminum, stainless steel, gold, or platinum.

A twenty-first embodiment, which is the method of any of the sixteenth through the nineteenth embodiment, wherein the elongated structure comprises a mixture of metal and non-metal material.

A twenty-second embodiment, which is the method of any of the sixteenth through the nineteenth embodiment, wherein the elongated structure comprises a non-metal material having a thermal conductivity similar to the thermal conductivity of metal.

A twenty-third embodiment, which is a downhole tool assembly comprising a downhole tool; an extended probe coupled at an uphole end of the extended probe to a downhole end of the downhole tool; a plurality of centralizing vanes coupled to the extended probe; and a plurality of fluid flow rate sensors according to any of the first through the tenth embodiment, wherein each fluid flow rate sensor is disposed between two of the centralizing vanes.

A twenty-fourth embodiment, which is a downhole tool assembly comprising a downhole tool; an extended probe coupled at an uphole end of the extended probe to a downhole end of the downhole tool; a plurality of centralizing vanes coupled to the extended probe; and a plurality of fluid flow rate sensors, wherein each fluid flow rate sensor is disposed between two of the centralizing vanes, and wherein each fluid flow rate sensor comprises an elongated structure, at least one temperature transducer coupled to the elongated structure, a heater configured to heat the elongated structure, and a control unit configured to turn the heater on and off and to analyze an indication of temperature from the at least one temperature transducer to determine a flow rate of fluid in intimate contact with the elongated structure.

A twenty-fifth embodiment, which is the downhole tool assembly of the twenty-fourth embodiment, wherein the downhole tool is a submersible pump assembly comprising a motor and a centrifugal pump assembly.

A twenty-sixth embodiment, which is the downhole tool assembly of the twenty-fourth embodiment, wherein the downhole tool is an electric submersible pump assembly comprising an electric motor, a seal section, and a centrifugal pump assembly.

A twenty-seventh embodiment, which is the downhole tool assembly of the twenty-sixth embodiment, wherein the electric submersible pump assembly further comprises a gas separator.

A twenty-eighth embodiment, which is the downhole tool assembly of either the twenty-sixth or the twenty-seventh embodiment, further comprising an electric cable that extends from the electric motor to a surface, wherein each of the plurality of fluid flow rate sensors comprises a communication line that is connected to a communication line that is coupled to the extended probe and connects to a communication line embedded in the electric cable.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A fluid flow rate sensor, comprising:
   a metal bar;
   a heating element installed into a first end of the metal bar;
   a first temperature transducer coupled to an outside of the metal bar at a first predefined location;
   a second temperature transducer coupled to the outside of the metal bar at a second predefined location; and
   a control unit that is configured to turn the heating element on and off, to analyze a first temperature indication received from the first temperature transducer, to analyze a second temperature indication received from the second temperature transducer, to determine a flow rate of a fluid that is in intimate contact with the outside of the metal bar based on analyzing the first temperature indication over time and the second temperature indication over time, based on when the heating element is turned on, and based on when the heating element is turned off, and to output the flow rate via a communication line.

2. The fluid flow rate sensor of claim 1, wherein the first temperature transducer and the second temperature transducer each comprises a thermocouple.

3. The fluid flow rate sensor of claim 1, wherein the first temperature transducer and the second temperature transducer each comprises a resistance temperature detector (RTD).

4. The fluid flow rate sensor of claim 1, wherein the metal bar comprises copper, aluminum, stainless steel, gold, or platinum.

5. The fluid flow rate sensor of claim 1, wherein the control unit is configured to receive and store default values of thermal properties of the fluid that is in intimate contact with the outside of the metal bar and wherein the control unit determines the flow rate of the fluid that is in intimate contact with the outside of the metal bar based in part on the stored default values of thermal properties of the fluid that is in intimate contact with the outside of the metal bar.

6. The fluid flow rate sensor of claim 5, wherein the control unit is configured to store a plurality of sets of default values of thermal properties of the fluid that is in intimate contact with the outside of the metal bar, wherein the control unit is configured to select which of the sets of default values of thermal properties of the fluid that is in intimate contact with the outside of the metal bar to use to determine the flow rate of the fluid that is in intimate contact with the outside of the metal bar, and wherein the control unit is configured to output the values of the selected set of default values of thermal properties of the fluid that is in intimate contact with the outside of the metal bar via the communication line.

7. The fluid flow rate sensor of claim 1, wherein the control unit is configured with known values of thermal properties of the metal bar and wherein the control unit determines the flow rate of the fluid that is in intimate contact with the outside of the metal bar based in part on the configured known values of thermal properties of the metal bar.

8. A system, comprising:
a fluid conduit;
an at least one fluid flow rate sensor installed in an interior of the fluid conduit, wherein each fluid flow rate sensor comprises
a metal bar,
a heating element installed into a first end of the metal bar,
a first temperature transducer coupled to an outside of the metal bar at a first location,
a second temperature transducer coupled to the outside of the elongated structure metal bar at a second location, and
a control unit that is configured to turn the heating element on and off, to analyze a first temperature indication received from the first temperature transducer, to analyze a second temperature indication received from the second temperature transducer, and to determine a flow rate of a fluid flowing in the fluid conduit based on analyzing the first temperature indication over time and the second temperature indication over time, based on when the heating element is turned on, and based on when the heating element is turned off;
a fluid flow rate transmitter operable to transmit the flow rate sensed by the at least one fluid flow rate sensor and to transmit an identity of the at least one fluid flow rate sensor; and
a receiver operable to receive the transmission of the flow rate of the at least one fluid flow rate sensor.

9. The system of claim 8, wherein the fluid conduit is a production tubing in a wellbore.

10. The system of claim 8, wherein the system comprises a horizontal pump system (HPS) comprising a motor comprising a first drive shaft and a centrifugal pump assembly comprising a second drive shaft that is coupled directly or indirectly to the first drive shaft of the motor and a plurality of pump stages, wherein each pump stage comprises an impeller coupled to the second drive shaft and a diffuser retained by a housing of the centrifugal pump assembly and wherein the fluid conduit is fluidically coupled to an inlet of the centrifugal pump assembly or to an outlet of the centrifugal pump assembly.

11. A method of sensing a rate of a fluid flow, comprising:
heating a first end of a metal bar for a period of time and then stopping the heating, wherein the metal bar is disposed in the fluid flow and wherein the thermal properties of the metal bar are known;
receiving an indication of a first temperature by a sensor controller from a first temperature transducer coupled to an outside of the metal bar;
receiving an indication of a second temperature by the sensor controller from a second temperature transducer coupled to an outside of the metal bar;
analyzing the indication of the first temperature over time in combination with the indication of the second temperature over time by the sensor controller, based on the known thermal properties of the metal bar, based on when the heating starts, based on when the heating stops, and based on default values of thermal properties of the fluid; and
determining the flow rate of the fluid by the sensor controller based on the analyzing.

12. The method of claim 11, further comprising transmitting the default values of thermal properties of the fluid to the sensor controller.

13. The method of claim 11, wherein the sensor controller starts the heating cyclically between about every 10 seconds and about every 120 seconds.

14. The method of claim 11, wherein the method further comprises adjusting a speed of an electric motor that provides torque to a pump that is pumping the fluid based on the determined flow rate of the fluid.

15. The method of claim 11, wherein the metal bar comprises copper, aluminum, stainless steel, gold, or platinum.

16. A downhole tool assembly, comprising:
a downhole tool;
an extended probe coupled at an uphole end of the extended probe to a downhole end of the downhole tool;
a plurality of centralizing vanes coupled to the extended probe; and
a plurality of fluid flow rate sensors, wherein each fluid flow rate sensor is disposed between two of the centralizing vanes, and wherein each fluid flow rate sensor comprises an elongated structure, at least one temperature transducer coupled to the elongated structure, a heater configured to heat the elongated structure, and a control unit configured to turn the heater on and off and to analyze an indication of temperature from the at least one temperature transducer to determine a flow rate of fluid in intimate contact with the elongated structure.

17. The downhole tool assembly of claim 16, wherein the downhole tool is a submersible pump assembly comprising a motor and a centrifugal pump assembly.

18. The downhole tool assembly of claim 16, wherein the downhole tool is an electric submersible pump assembly comprising an electric motor, a seal section, and a centrifugal pump assembly.

19. The downhole tool assembly of claim 18, wherein the electric submersible pump assembly further comprises a gas separator.

20. The downhole tool assembly of claim 18, further comprising an electric cable that extends from the electric motor to a surface, wherein each of the plurality of fluid flow rate sensors comprises a communication line that is connected to a communication line that is coupled to the extended probe and connects to a communication line embedded in the electric cable.

21. A system, comprising:
a fluid conduit that is a casing in a wellbore;
a production tubing disposed in the casing;

an electric submersible pump assembly disposed in the casing and comprising an electric motor, a seal section coupled to an uphole end of the electric motor, and a centrifugal pump coupled directly or indirectly to the seal section and having an outlet fluidically coupled to the production tubing;

an at least one fluid flow rate sensor installed in an interior of the fluid conduit, wherein each fluid flow rate sensor comprises an elongated structure, a heating element installed into a first end of the elongated structure, a first temperature transducer coupled to an outside of the elongated structure at a first location, a second temperature transducer coupled to the outside of the elongated structure at a second location, and a control unit that is configured to turn the heating element on and off, to analyze a first temperature indication received from the first temperature transducer, to analyze a second temperature indication received from the second temperature transducer, and to determine a flow rate of a fluid flowing in the fluid conduit based on analyzing the first temperature indication and the second temperature indication;

a probe structure coupled to a downhole end of the electric motor;

a centralizer comprising a plurality of vanes coupled to the probe structure, wherein the at least one fluid flow rate sensor is retained by at least one bracket that is coupled to the centralizer;

a fluid flow rate transmitter operable to transmit the flow rate sensed by the at least one fluid flow rate sensor and to transmit an identity of the at least one fluid flow rate sensor; and a receiver operable to receive the transmission of the flow rate of the at least one fluid flow rate sensor.

* * * * *